United States Patent [19]

Chen

[11] Patent Number: 5,297,445
[45] Date of Patent: Mar. 29, 1994

[54] STRUCTURE OF HANDLE OF BICYCLE
[75] Inventor: Liu Chen, Changhua, Taiwan
[73] Assignee: Lu Goo Co., Ltd., Changhua, Taiwan
[21] Appl. No.: 83,077
[22] Filed: Jun. 24, 1993
[51] Int. Cl.5 .............................................. B62K 21/12
[52] U.S. Cl. ................................. 74/551.3; 74/551.1; 74/551.8; 403/30; 403/31; 403/122; 403/373
[58] Field of Search ................. 74/551.1, 551.3, 551.8; 403/30, 31, 122, 373; 280/297, 288.4, 278, 279, 287

[56]  References Cited

U.S. PATENT DOCUMENTS

| 4,155,590 | 5/1979 | Cunningham | 403/91 X |
| 4,767,232 | 8/1988 | Francis | 403/91 |
| 4,955,891 | 9/1990 | Carol | 403/91 X |
| 5,056,951 | 10/1991 | Mariani | 403/90 |
| 5,154,094 | 10/1992 | Klieber | 74/551.8 X |
| 5,154,095 | 10/1992 | Giard | 74/551.1 |
| 5,163,339 | 11/1992 | Giard et al. | 74/551.3 |
| 5,193,930 | 3/1993 | Chi | 74/551.1 X |
| 5,201,243 | 4/1993 | Schneider | 74/551.3 X |
| 5,226,341 | 7/1993 | Shores | 74/551.8 |

FOREIGN PATENT DOCUMENTS

| 3143714 | 5/1983 | Fed. Rep. of Germany | 74/551.1 |
| 1043363 | 9/1966 | United Kingdom | 403/90 |

Primary Examiner—Vinh T. Luong
Attorney, Agent, or Firm—Merchant, Gould, Smith, Edell, Welter & Schmidt

[57]  ABSTRACT

An angle adjustable grip mounting device including a cylindrical connector fastened to either end of a tubular bicycle handlebar by a short tube and a screw nut by means of the control of an adjusting screw to hold a grip by means of two arched symmetrical clamping plates. The grip has a round head held between two arched clamping plates received inside the cylindrical connector, and retained in position by the two arched clamping plates, which are spaced by an opening on the peripheral wall of the cylindrical connector, are fastened together. The screw nut and the short tube become biased on two opposite sides and firmly retained in the tubular bicycle handlebar as the adjusting screw is turned clockwise to move the screw nut toward the short tube.

1 Claim, 4 Drawing Sheets

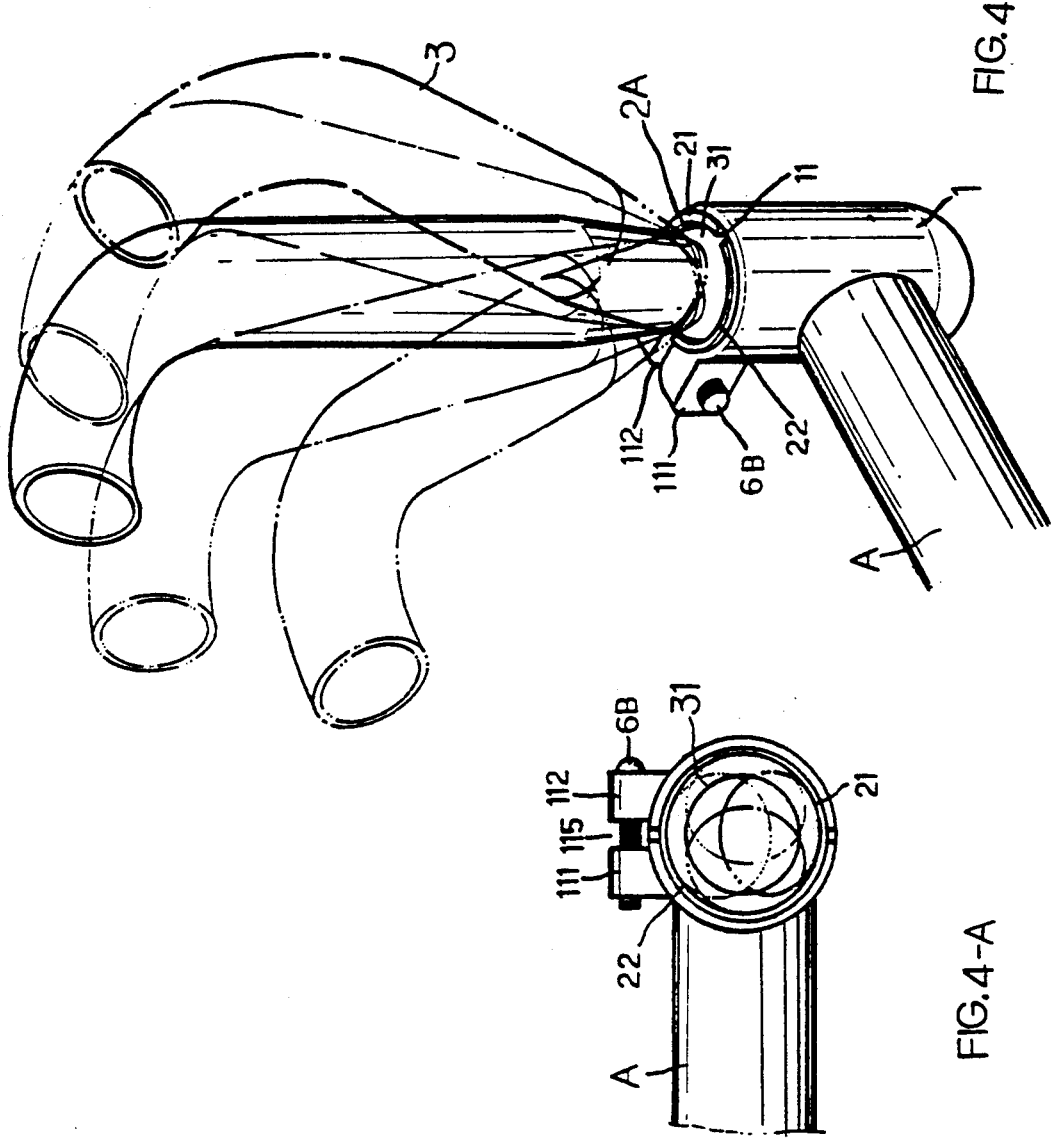

STRUCTURE OF HANDLE OF BICYCLE

BACKGROUND OF THE INVENTION

The present invention relates bicycle handlebars, and more particularly to an angle-adjustable grip mounting device for mounting a grip to a bicycle handlebar.

FIG. 1 illustrates a bicycle handlebar according to the prior art which comprises two curved grips B connected to two opposite ends A1 of a transverse tube A. Each grip B has one end terminated to an eye mounted around either end A1 of the transverse tube and then fixed in place by a respective tightening up screw C. If the angular position of either grip B is to be changed, the tightening up screw C is loosened and then screwed tight again after the respective grip B has been turned to the desired angle. The thread of the tightening up screw C may be damaged easily when repeatedly loosening the tightening up screw C and then screwing it tight again. Therefore this grip mounting structure is not durable in use.

SUMMARY OF THE INVENTION

According to one aspect of the present invention, the angle adjustable grip mounting device is comprised of a cylindrical connector fastened to either end of a tubular bicycle handlebar by a short tube and a screw nut by means of the control of an adjusting screw to hold a grip by means of two arched symmetrical clamping plates.

According to another aspect of the present invention, the cylindrical connector has two lugs projected from the outside wall and spaced by an opening, which hold the two arched symmetrical clamping plates together as they are fastened together by a screw bolt, and the grip has a round head inserted in a hole on the cylindrical connector and held in between the two arched symmetrical clamping plates. As the screw bolt is loosened to release the lugs from each other, the grip can be rotated on the cylindrical connector to change its position.

According to still another aspect of the present invention, the short tube has an outer end terminated to a bevel edge; the screw nut has a bevel edge on one end fitted over the bevel edge on the short tube, and a screw hole deviated from the longitudinal axis thereof into which the adjusting screw is threaded. The screw nut and the short tube become biased on two opposite sides and firmly retained in the tubular bicycle handlebar as the adjusting screw is turned in one direction to move the screw nut toward the short tube; the screw nut and the short tube become longitudinally aligned and disconnected from the tubular bicycle handlebar as the adjusting screw in turned in the reversed direction to move the screw nut away from the short tube.

BRIEF DESCRIPTION OF THE DRAWINGS

FIG. 4 illustrates the grip rotated on the cylindrical connector according to the present invention; and FIG. 4A shows the rotary motion of the round head of the grip within the ball socket of the clamping plates according to the present invention.

DETAILED DESCRIPTION OF THE PREFERRED EMBODIMENT

Figure 1:
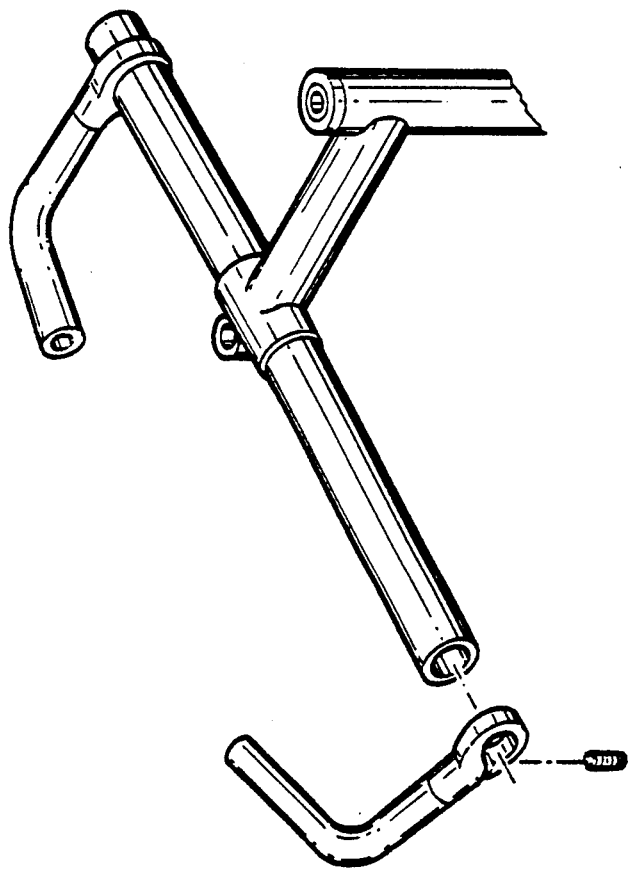
FIG. 1 is a dismantled view of a bicycle handlebar assembly according to the prior art.
Figure 2:
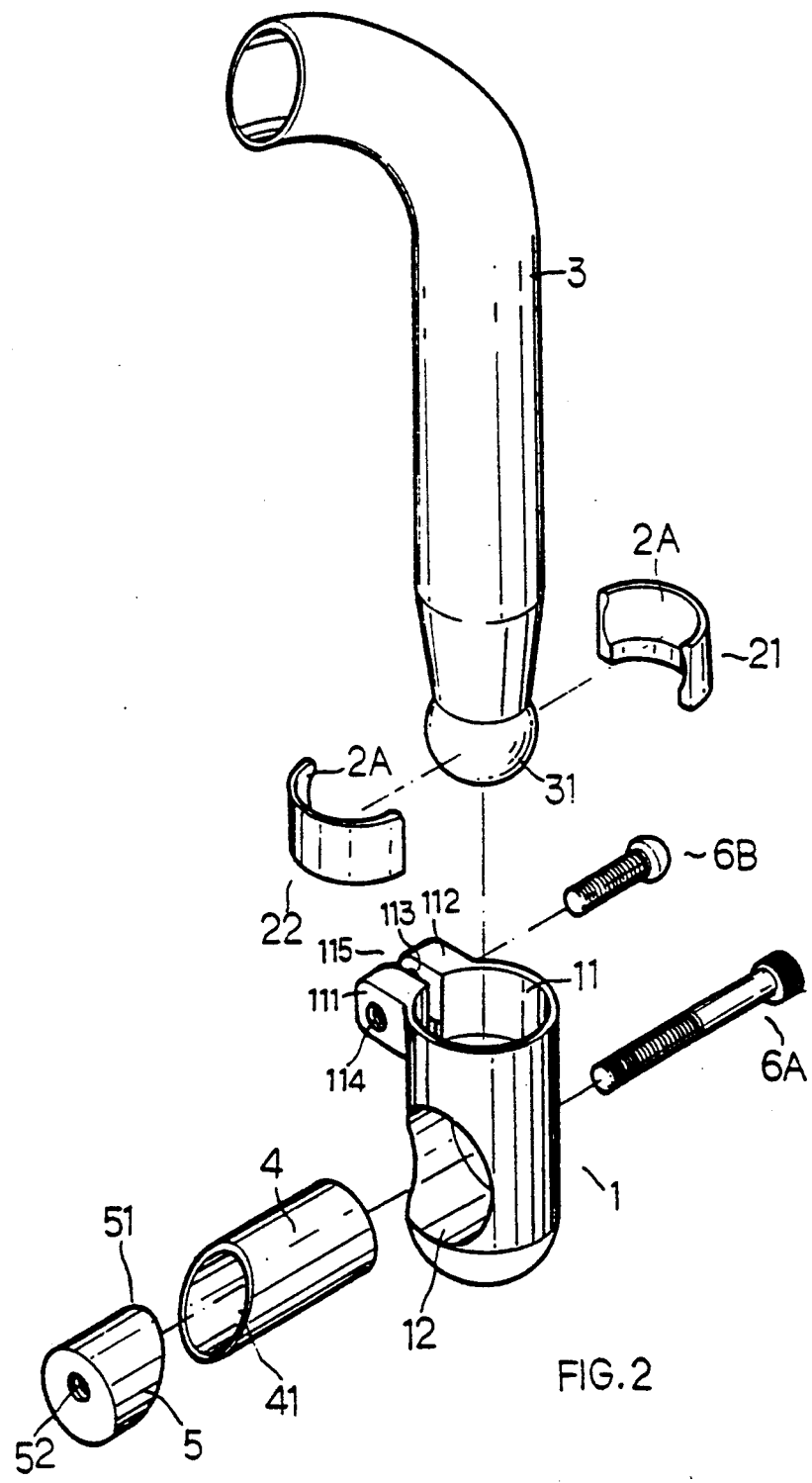
FIG. 2 is an exploded view of a grip mounting device according to the preferred embodiment of the present invention.
Figure 3:
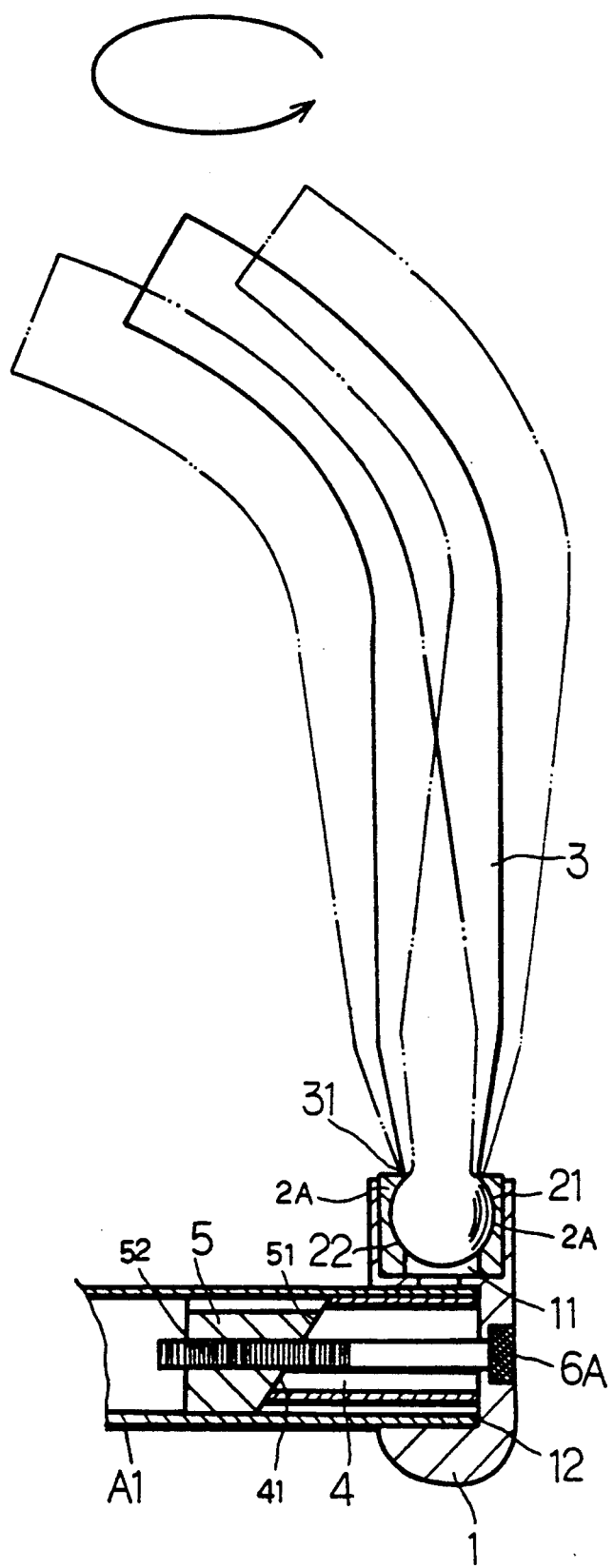
FIG. 3 is a sectional assembly view of the grip mounting device of the preferred embodiment of the present invention, showing the screw nut and the tube biased on two opposite sides and retained in the bicycle handlebar.

Referring to FIGS. 2, 3, 4 and 4A, a grip 3 is fastened to either end A1 of a bicycle's handlebar A by a cylindrical connector 1. The connector 1 comprises a longitudinal hole 11 at the top, a transverse hole 12 communicated with the longitudinal hole 11, two lugs 111;112 with respective screw holes 113;113 perpendicularly projected from the outside wall thereof at the top, an opening 113 on the periphery at the top in communication with the longitudinal hole 11 to separate the lugs 111;112. The grip 3 has a round head 31 inserted in the longitudinal hole 11 of the connector 1. Two arched clamping plates 21;22 are symmetrically disposed inside the longitudinal hole 11 of the cylindrical connector 1 and covered over the round head 31. Each clamping plate 21 or 22 has an inside wall 2A fitting over the outside surface of the round head 31. A screw bolt 6B is threaded into the screw holes 113;114 to hold the lugs 111;112 together. As the lugs 111;112 are fastened together, the two arched clamping plates 21;22 are connected into a ball socket to hold the round head 31 of the grip 3 inside the cylindrical connector 1 tightly. The transverse hole 12 is relatively bigger than the longitudinal hole 11. A tube 4 is received in the transverse hole 12 of the cylindrical connector 1, a screw nut 5 is fastened to the tube 4 outside the cylindrical connector 1 by an adjusting 6A. The tube 4 has an outer end terminated to a bevel edge 41. The screw nut 5 has one end terminated to a bevel edge 51 fitting over the bevel edge 41 on the tube 4, and a screw hole 52 in the longitudinal direction deviated from the central axis thereof. Because the screw hole 52 is deviated from the central axis of the screw nut 5, the tube 4 and the screw nut 5 become biased on two opposite sides as they are moved toward each other by turning the adjusting screw 6A in one direction (clockwise); the tube 4 and the screw nut 5 become longitudinally aligned as they are moved apart from each other by turning the adjusting 6A in the reversed direction (counter-clockwise).

When assembled, the screw nut 5 and the tube 4 are inserted into either end A1 of the bicycle handlebar and turned to the desired angle, and then the adjusting 6A is turned clockwise to move the screw nut 5 toward the tube 4. Because the screw nut 5 and the tube 4 are biased on two opposite sides as the screw nut 5 is moved toward the tube 4, the cylindrical connector 1 becomes firmly retained to the handlebar A at the desired angle. Before fastening the lugs 111;112 tightly together, the grip 3 can be rotated through 360° angle on the cylindrical connector 1. After the grip 3 has been turned to the desired angle, the lugs 111;112 are tightly fastened together by the screw bolt 6B.

What is claimed is:

1. An angle-adjustable grip mounting device comprising: a grip having one end terminated to a round head; a cylindrical connector to connect said grip to either end of a tubular bicycle handlebar, said cylindrical connector comprising a longitudinal hole on one end, a transverse hole on one side communicated with said longitudinal hole, a small through hole on an opposite side aligned with said transverse hole, two lugs projected from the outside wall at the top and separated by an opening; two arched clamping plates symmetrically disposed inside said longitudinal hole of said cylindrical connector to hold said round head of said grip inside said cylindrical connector as said lugs of said cylindrical connector are fastened together by a screw bolt; a short tube inserted in said transverse hole of said cylindrical connector, said short tube having an outer end terminated to a bevel edge; and a screw nut connected to said short tube outside said cylindrical connector by an adjusting screw, said screw nut comprising a bevel edge on one end fitted over the bevel edge on said short tube, a screw hole deviated from the longitudinal axis thereof into which said adjusting screw is threaded; whereby said screw nut and said short tube become biased on two opposite sides and firmly retained in said tubular bicycle handlebar as said adjusting screw is turned in one direction to move said screw nut toward said short tube; said screw nut and said short tube become longitudinally aligned and disconnected from said tubular bicycle handlebar as said adjusting screw in turned in the reversed direction to move said screw nut away from said short tube.

* * * * *